(12) United States Patent
Harrington et al.

(10) Patent No.: US 10,828,842 B2
(45) Date of Patent: Nov. 10, 2020

(54) METHOD AND SYSTEM FOR CUTTING AND PLACING NOSE WIRES IN A FACEMASK MANUFACTURING PROCESS

(71) Applicant: O&M Halyard, Inc., Mechanicsville, VA (US)

(72) Inventors: David Lamar Harrington, Cumming, GA (US); Mark Thomas Pamperin, Cumming, GA (US); Nathan Craig Harris, Canton, GA (US); Joseph P. Weber, Suwanee, GA (US); Ajay Y. Houde, Johns Creek, GA (US)

(73) Assignee: O&M Halyard, Inc., Mechanicsville, VA (US)

( * ) Notice: Subject to any disclaimer, the term of this patent is extended or adjusted under 35 U.S.C. 154(b) by 0 days.

(21) Appl. No.: 15/768,139

(22) PCT Filed: Oct. 16, 2015

(86) PCT No.: PCT/US2015/055867
§ 371 (c)(1),
(2) Date: Apr. 13, 2018

(87) PCT Pub. No.: WO2017/065788
PCT Pub. Date: Apr. 20, 2017

(65) Prior Publication Data
US 2018/0311905 A1 Nov. 1, 2018

(51) Int. Cl.
*B29C 65/00* (2006.01)
*A41D 13/00* (2006.01)
(Continued)

(52) U.S. Cl.
CPC .......... *B29C 65/4825* (2013.01); *A41D 13/11* (2013.01); *B29C 65/522* (2013.01);
(Continued)

(58) Field of Classification Search
CPC ................ B29C 66/474; B29C 69/001; B29C 2793/0072; A41D 13/11; A41D 13/1123;
(Continued)

(56) References Cited

U.S. PATENT DOCUMENTS 2,354,294 A 7/1944 Schimmel
3,123,125 A 3/1964 Lacey, Jr.
(Continued)

FOREIGN PATENT DOCUMENTS

CA 828007 A 11/1969
CA 2 325 975 A1 5/2002
(Continued)

OTHER PUBLICATIONS

International Search Report and Written Opinion for PCT/US2015/055867, dated Jun. 2, 2016, 11 pages.

*Primary Examiner* — Linda L Gray
(74) *Attorney, Agent, or Firm* — Dority & Manning, P.A.

(57) ABSTRACT

A method and associated system for cutting and placing individual nose wires in a facemask production line include supplying a continuous wire from a supply source to a cutting station where the continuous wire is cut into individual nose wires having a defined length. The nose wires are then conveyed to a treatment station prior to being deposited onto a carrier web. At the treatment station, a surface treatment is performed on a side of the nose wires that results in an increased surface attachment of the nose wires to the carrier web.

14 Claims, 4 Drawing Sheets

(51) Int. Cl.
  *A62B 18/00* (2006.01)
  *A62B 23/00* (2006.01)
  *B29C 65/48* (2006.01)
  *A41D 13/11* (2006.01)
  *B29C 65/52* (2006.01)
  *B29C 69/00* (2006.01)
  *A62B 18/02* (2006.01)
  *A62B 23/02* (2006.01)
  *B65H 45/22* (2006.01)
  *B65H 45/28* (2006.01)
  *B29L 31/48* (2006.01)

(52) U.S. Cl.
  CPC .......... *B29C 66/474* (2013.01); *B29C 69/001* (2013.01); *A62B 18/02* (2013.01); *A62B 23/025* (2013.01); *B29L 2031/4835* (2013.01); *B65H 45/22* (2013.01); *B65H 45/28* (2013.01); *Y10T 156/1049* (2015.01); *Y10T 156/1075* (2015.01)

(58) Field of Classification Search
  CPC . A41D 13/1115; Y10T 56/1075; A62B 18/02; A62B 23/025
  See application file for complete search history.

(56) References Cited

U.S. PATENT DOCUMENTS

| | | |
|---|---|---|
| 3,242,783 A | 3/1966 | Schmermund |
| 3,670,474 A | 6/1972 | Vieson et al. |
| 3,800,640 A | 4/1974 | Barrie |
| 3,847,046 A | 11/1974 | Schmermund |
| 3,926,097 A | 12/1975 | Santa Maria et al. |
| 3,958,390 A | 5/1976 | Pringle, Jr. et al. |
| 3,971,369 A | 7/1976 | Aspelin et al. |
| 3,983,774 A | 10/1976 | Seragnoli |
| 4,261,457 A | 4/1981 | van Maanen |
| 4,269,315 A | 5/1981 | Boyce |
| 4,440,289 A | 4/1984 | Weis |
| 4,467,589 A | 8/1984 | van Maanen |
| 4,525,977 A | 7/1985 | Matt |
| 4,543,152 A | 9/1985 | Nozaka |
| 4,549,386 A | 10/1985 | Wilson |
| 4,550,856 A | 11/1985 | Ballmann et al. |
| 4,630,310 A | 12/1986 | Winesett |
| 4,662,005 A | 5/1987 | Grier-Idris |
| 4,722,168 A | 2/1988 | Heaney |
| 4,809,481 A | 3/1989 | Früh et al. |
| 5,079,902 A | 1/1992 | Seko et al. |
| 5,117,614 A | 6/1992 | Johnsen |
| 5,155,967 A | 10/1992 | Branson |
| 5,170,610 A | 12/1992 | Tisma |
| 5,322,061 A | 6/1994 | Brunson |
| 5,548,946 A | 8/1996 | Holub |
| 5,615,767 A | 4/1997 | Eull et al. |
| 5,724,677 A | 3/1998 | Bryant et al. |
| 5,727,369 A | 3/1998 | Mosse |
| 5,921,375 A | 7/1999 | Van Laar |
| 6,098,785 A | 8/2000 | Van Maanen |
| 6,117,515 A | 9/2000 | Brunson et al. |
| 6,122,898 A | 9/2000 | De Kort |
| 6,123,077 A | 9/2000 | Bostock et al. |
| 6,125,849 A | 10/2000 | Williams et al. |
| 6,173,712 B1 | 1/2001 | Brunson |
| 6,174,397 B1 | 1/2001 | Johnson |
| 6,394,090 B1 | 5/2002 | Chen et al. |
| 6,524,423 B1 | 2/2003 | Hilt et al. |
| 6,729,103 B1 | 5/2004 | Hartness et al. |
| 6,868,984 B2 | 3/2005 | Griesbach, III et al. |
| 6,886,563 B2 | 5/2005 | Bostock et al. |
| 7,703,260 B1 | 4/2010 | Watkins |
| 8,061,356 B2 | 11/2011 | Bowen |
| 8,700,214 B2 | 4/2014 | Fortman |
| 10,227,202 B2 | 3/2019 | Pamperin et al. |
| 10,492,547 B2 | 12/2019 | Weber et al. |
| 2002/0095913 A1 | 7/2002 | Honegger |
| 2003/0000805 A1 | 1/2003 | Wild et al. |
| 2003/0010422 A1 | 1/2003 | Starkey |
| 2004/0121107 A1 | 6/2004 | Bell et al. |
| 2004/0144619 A1 | 7/2004 | Ohiro et al. |
| 2004/0262127 A1 | 12/2004 | Harnish et al. |
| 2005/0166733 A1 | 8/2005 | Piscitello |
| 2006/0070353 A1 | 4/2006 | Van Dam |
| 2008/0072721 A1 | 3/2008 | Kern |
| 2008/0251210 A1 | 10/2008 | Chen |

FOREIGN PATENT DOCUMENTS

| | | |
|---|---|---|
| CN | 104872866 A | 9/2015 |
| CN | 104939377 A | 9/2015 |
| DE | 3736868 A1 | 5/1989 |
| EP | 0 257 852 A2 | 3/1988 |
| EP | 0 622 298 A1 | 11/1994 |
| EP | 0 640 526 A1 | 3/1995 |
| EP | 0 791 537 A1 | 8/1997 |
| EP | 0 806 343 A2 | 11/1997 |
| EP | 0 894 752 A1 | 2/1999 |
| EP | 1 048 595 A1 | 11/2000 |
| EP | 1 757 552 A2 | 2/2007 |
| EP | 1 840 033 A2 | 10/2007 |
| EP | 2 484 611 A2 | 8/2012 |
| EP | 2 757 062 A1 | 7/2014 |
| EP | 2 801 790 A1 | 11/2014 |
| FR | 1.588.621 | 4/1970 |
| GB | 364557 | 12/1931 |
| GB | 1 216 310 | 12/1970 |
| GB | 1 232 053 | 5/1971 |
| GB | 1 361 496 | 7/1974 |
| GB | 2 092 090 A | 8/1982 |
| JP | S 62103536 U | 7/1987 |
| JP | H04311405 A | 11/1992 |
| JP | H05-78007 A | 3/1993 |
| JP | H05170209 A | 7/1993 |
| JP | H06211214 A | 8/1994 |
| JP | 2000198600 A | 7/2000 |
| JP | 2002052487 A | 2/2002 |
| JP | 2005272512 A | 10/2005 |
| JP | 2007084309 A | 4/2007 |
| JP | 2008055035 A | 3/2008 |
| JP | 2009286490 A | 12/2009 |
| JP | 2011178459 A | 9/2011 |
| JP | 2011200510 A | 10/2011 |
| JP | 2012201409 A | 10/2012 |
| JP | 2013230380 A | 11/2013 |
| KR | 100550225 B1 | 2/2006 |
| WO | WO 97/32494 | 9/1997 |
| WO | WO 99/24119 A1 | 5/1999 |
| WO | WO 02/28760 A1 | 4/2002 |
| WO | WO 2005/054106 A1 | 6/2005 |

METHOD AND SYSTEM FOR CUTTING AND PLACING NOSE WIRES IN A FACEMASK MANUFACTURING PROCESS

FIELD OF THE INVENTION

The present invention relates generally to the field of protective facemasks, and more specifically to a method and system for cutting and placing nose wires in the manufacturing of such facemasks.

FAMILY OF RELATED APPLICATIONS

The present application is related by subject matter to the following concurrently filed PCT applications (all of which designate the US):

a. International Application No. PCT/US2015/055858; International Publication No: WO2017/065783; entitled "Method and System for Splicing Nose Wire in a Facemask Manufacturing Process".

b. International Application No. PCT/US2015/055861; International Publication No: WO2017/065784; entitled "Method and System for Splicing Nose Wire in a Facemask Manufacturing Process".

c. International Application No. PCT/US2015/055863; International Publication No: WO2017/065785; entitled "Method and System for Introducing a Reserve Nose Wire in a Facemask Production Line".

d. International Application No. PCT/US2015/055765; International Publication No: WO2017/065786; entitled "Method for Cutting and Placing Nose Wires in a Facemask Manufacturing Process".

e. International Application No. PCT/US2015/055871; International Publication No: WO2017/065790; entitled "Method and System for Placing Nose Wires in a Facemask Manufacturing Process".

f. International Application No. PCT/US2015/055872; International Publication No: WO2017/065791; entitled "Method and System for Placing Nose Wires in a Facemask Manufacturing Process".

g. International Application No. PCT/US2015/055876; International Publication No: WO2017/065792; entitled "Method and System for Wrapping and Preparing Facemasks for Packaging in a Facemask Manufacturing Line".

h. International Application No. PCT/US2015/055878; International Publication No: WO2017/065793; entitled "Method and System for Automated Stacking and Loading Wrapped Facemasks into a Carton in a Facemask Manufacturing Line".

i. International Application No. PCT/US2015/055882; International Publication No: WO2017/065794; entitled "Method and System for Automated Stacking and Loading of Wrapped Facemasks into a Carton in a Facemask Manufacturing Line".

The above cited applications are incorporated herein by reference for all purposes. Any combination of the features and aspects of the subject matter described in the cited applications may be combined with embodiments of the present application to yield still further embodiments of the present invention.

BACKGROUND OF THE INVENTION

Various configurations of disposable filtering facemasks or respirators are known and may be referred to by various names, including "facemasks", "respirators", "filtering face respirators", and so forth. For purposes of this disclosure, such devices are referred to generically as "facemasks."

The ability to supply aid workers, rescue personnel, and the general populace with protective facemasks during times of natural disasters or other catastrophic events is crucial. For example, in the event of a pandemic, the use of facemasks that offer filtered breathing is a key aspect of the response and recovery to such event. For this reason, governments and other municipalities generally maintain a ready stockpile of the facemasks for immediate emergency use. However, the facemasks have a defined shelf life, and the stockpile must be continuously monitored for expiration and replenishing. This is an extremely expensive undertaking.

Recently, investigation has been initiated into whether or not it would be feasible to mass produce facemasks on an "as needed" basis during pandemics or other disasters instead of relying on stockpiles. For example, in 2013, the Biomedical Advanced Research and Development Authority (BARDA) within the Office of the Assistant Secretary for Preparedness and Response in the U.S. Department of Health and Human Services estimated that up to 100 million facemasks would be needed during a pandemic situation in the U.S., and proposed research into whether this demand could be met by mass production of from 1.5 to 2 million facemasks per day to avoid stockpiling. This translates to about 1,500 masks/minute. Current facemask production lines are capable of producing only about 100 masks/minute due to technology and equipment restraints, which falls far short of the estimated goal. Accordingly, advancements in the manufacturing and production processes will be needed if the goal of "on demand" facemasks during a pandemic is to become a reality.

The various configurations of filtration facemasks include a flexible, malleable metal piece, known as "nose wire", along the edge of the upper filtration panel to help conform the facemask to the user's nose and retain the facemask in place during use, as is well known. The nose wire may have a varying length and width between different sizes and mask configurations, but is generally cut from a spool in a continuous in-line process and laid onto a running carrier nonwoven web (which may include a plurality of nonwoven layers) along an edge that becomes a top edge of the finished mask. The edge is subsequently sealed with a binder material, which also encapsulates and permanently holds the nose wire in place at the top edge. However, prior to this encapsulation, the nose wire is not otherwise positively held to the carrier web. For mass production of facemasks at the throughputs mentioned above, the carrier web will necessarily move at a significantly greater transport speed as compared to conventional manufacturing lines. Consequently, it is believed that the nose wires will need to be positively held on the carrier web to ensure proper placement of the nose wires prior to the encapsulation process.

The present invention addresses this need and provides a method for high speed cutting and placement of nose wires on the running carrier web in an in-line manufacturing process of facemasks.

SUMMARY OF THE INVENTION

Objects and advantages of the invention will be set forth in the following description, or may be obvious from the description, or may be learned through practice of the invention.

In accordance with aspects of the invention, a method is provided for cutting and placing individual nose wires in a facemask production line. A continuous wire is supplied from a source, such a roll of the wire, to a cutting station in the facemask production line. At the cutting station, the continuous wire is cut into individual nose wires having a defined length. In one embodiment, the individual nose wires are conveyed from the cutting station to a treatment station prior to being conveyed to a carrier web. In an alternative embodiment, the treatment station may be operationally configured upstream of the cutting station. At the treatment station, a surface treatment is performed on a side of the nose wires that lies against the carrier web, wherein the surface treatment results in an increased surface attachment of the nose wires onto the carrier web as compared to an untreated surface wire. From the treatment station or the cutting station, the carrier web and attached nose wires are conveyed to a folder and bonder, wherein the nose wires are encapsulated in a binder web that is folded over an edge of the carrier material and bonded to the carrier material.

In a particular embodiment, the surface treatment includes applying an adhesive onto the side of the nose wires, wherein the adhesive has sufficient tack for the nose wires to quickly adhere to the carrier web. Various types of adhesives are suitable for this function, and the method is not limited to any particular adhesive. These types of adhesives are also known as transport tackifiers. A suitable adhesive may be a pressure-sensitive adhesive, wherein the method may include pressing the nose wires onto the carrier web after application of the adhesive, for example by passing the carrier web and nose wire below a pressing bar.

In a particular embodiment, the adhesive may be sprayed onto the side of nose wires. In another embodiment, the adhesive may be is coated onto the side of the nose wires, for example by a contact roller.

With a different embodiment, the surface treatment process may include altering a surface characteristic of the side of the nose wire that is placed against the carrier web. For example, this surface may be abraded to produce a "roughened" surface with increased frictional resistance to sliding or moving on the nonwoven carrier web. This abrasion process may be carried out mechanically by contacting the surface of the nose wires with an abrasion device, such as a stationary or moving abrasion stone, wire wheel, and so forth. In an alternate abrasion process, an abrasive chemical may be applied to the surface of the nose wires.

In still a further embodiment, the surface of the nose wire may be roughened by defining a pattern into the surface of the nose wire that increases surface roughness and, thus, resistance to sliding or moving of the nose wire on the carrier web. This pattern may be etched into the nose wire surface with a laser, or defined by a crimp roller.

The present invention also encompasses various system embodiments for cutting and placing individual nose wires in a facemask production line in accordance with the present methods, as described and supported herein.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

DETAILED DESCRIPTION OF REPRESENTATIVE EMBODIMENTS

Reference now will be made in detail to various embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention covers such modifications and variations as come within the scope of the appended claims and their equivalents.

As mentioned, the present methods and associated systems relate to cutting and placement of individual nose wires in a facemask production line. The downstream facemask production steps are not limiting aspects of the invention and, thus, will not be explained in great detail herein.

Also, the present disclosure refers to or implies conveyance or transport of certain components of the facemasks through the production line. It should be readily appreciated that any manner and combination of article conveyors (e.g., rotary and linear conveyors), article placers (e.g. vacuum puck placers), and transfer devices are well known in the article conveying industry and can be used for the purposes described herein. It is not necessary for an understanding and appreciation of the present methods to provide a detailed explanation of these well-known devices and system.

Various styles and configurations of facemasks that incorporate a nose wire are well known, including flat pleated facemasks, and the present methods may have utility in the production lines for these conventional masks. For illustrative purposes only, aspects of the present method are described herein with reference to a particular type of respirator facemask often referred to in the art as a "duckbill" mask, as illustrated in FIG. 1.

Figure 1:
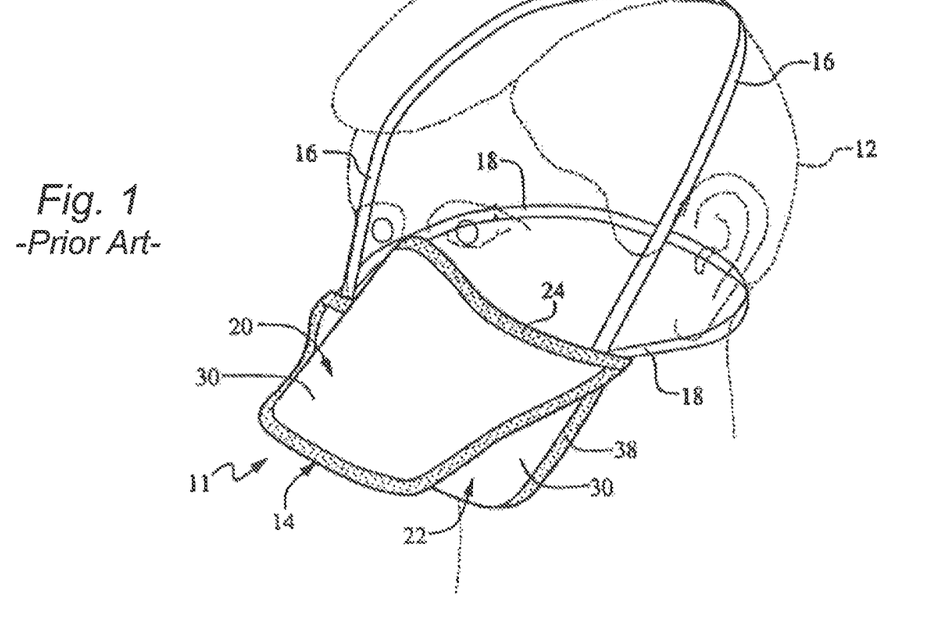
FIG. 1 is a perspective view of a conventional respiratory facemask worn by a user, the facemask incorporating a nose wire to conform the facemask to the user's face.
Figure 2:
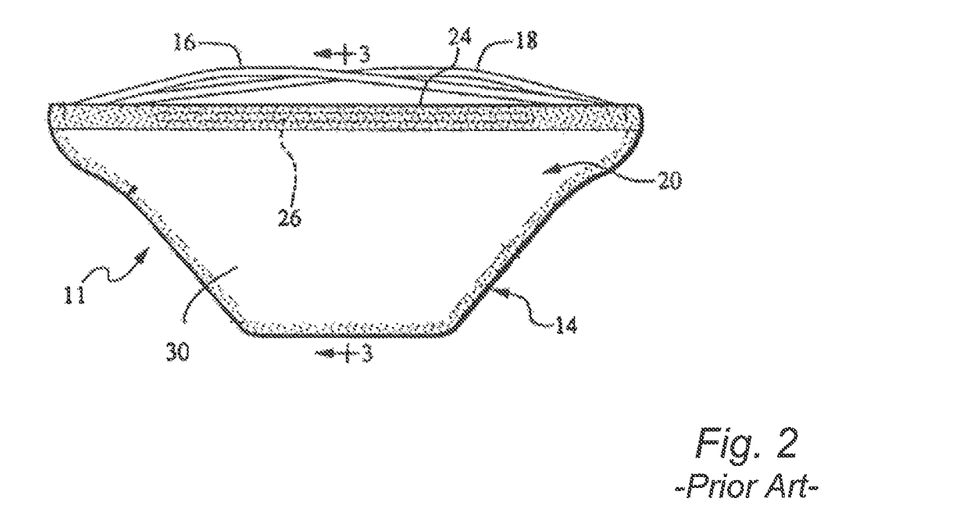
FIG. 2 is a top view of the conventional facemask of FIG. 1 is a folded state.
Figure 3:
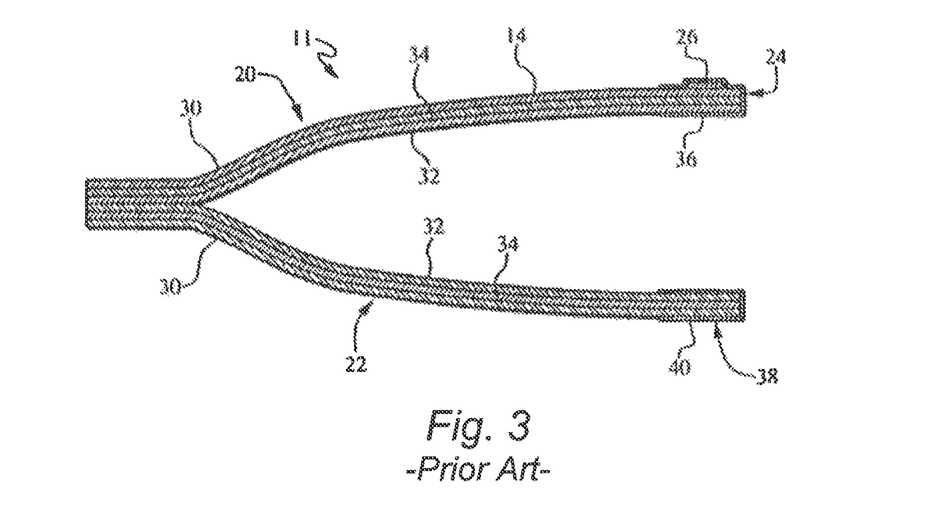
FIG. 3 is a cross-sectional view of the facemask of FIG. 2 taken along the lines indicated in FIG. 2.

Referring to FIGS. 1-3, a representative facemask 11 (e.g., a duckbill facemask) is illustrated on the face of wearer 12. The mask 11 includes filter body 14 that is secured to the wearer 12 by means of resilient and elastic straps or securing members 16 and 18. The filter body 14 includes an upper portion 20 and a lower portion 22, both of which have complimentary trapezoidal shapes and are preferably bonded together such as by heat and/or ultrasonic sealing along three sides. Bonding in this manner adds important structural integrity to mask 11.

The fourth side of the mask 11 is open and includes a top edge 24 and a bottom edge 38, which cooperate with each other to define the periphery of the mask 11 that contacts the wearer's face. The top edge 24 is arranged to receive an elongated malleable member 26 (FIGS. 2 and 3) in the form of a flat metal ribbon or wire (referred to herein as a "nose wire"). The nose wire 26 is provided so that top edge 24 of mask 11 can be configured to closely fit the contours of the nose and cheeks of wearer 12. The nose wire 26 is typically constructed from an aluminum strip with a rectangular cross-section. With the exception of having the nose wire 26 located along top edge 24 of the upper portion 20 of the mask 11, the upper and lower portions 20 and 22 may be identical.

As shown in FIG. 1, the mask 11 has the general shape of a cup or cone when placed on the face of wearer 12 and thus provides "off-the-face" benefits of a molded-cone style mask while still being easy for wearer 12 to carry mask 11 in a pocket prior to use. "Off-the-face" style masks provide a larger breathing chamber as compared to soft, pleated masks which contact a substantial portion of the wearer's face. Therefore, "off-the-face" masks permit cooler and easier breathing.

Blow-by associated with normal breathing of wearer 12 is substantially eliminated by properly selecting the dimension and location of the nose wire 26 with respect to top edge of 24. The nose wire 26 is preferably positioned in the center of top edge 24 and has a length in the range of fifty percent (50%) to seventy percent (70%) of the total length of the top edge 24.

As illustrated in cross-sectional view of FIG. 3, the upper and lower portions 20 and 22 may include multiple layers and each have an outer mask layer 30 and inner mask layer 32. Located between outer and inner mask layers 30, 32 is one or more intermediate layer 34 that comprises the filter media for the mask 11. This layer is typically constructed from a melt-blown polypropylene, extruded polycarbonate, melt-blown polyester, or a melt-blown urethane.

The top edge 24 of the mask 11 is faced with an edge binder 36 that extends across the open end of mask 11 and covers the nose wire 26. Similarly, the bottom edge 38 is encompassed by an edge binder 40. Edge binders 36 and 40 are folded over and bonded to the respective edges 24, 30 after placement of the nose wire 26 along the top edge 24. The edge binders 36, 40 may be constructed from a spun-laced polyester material.

Figure 4:
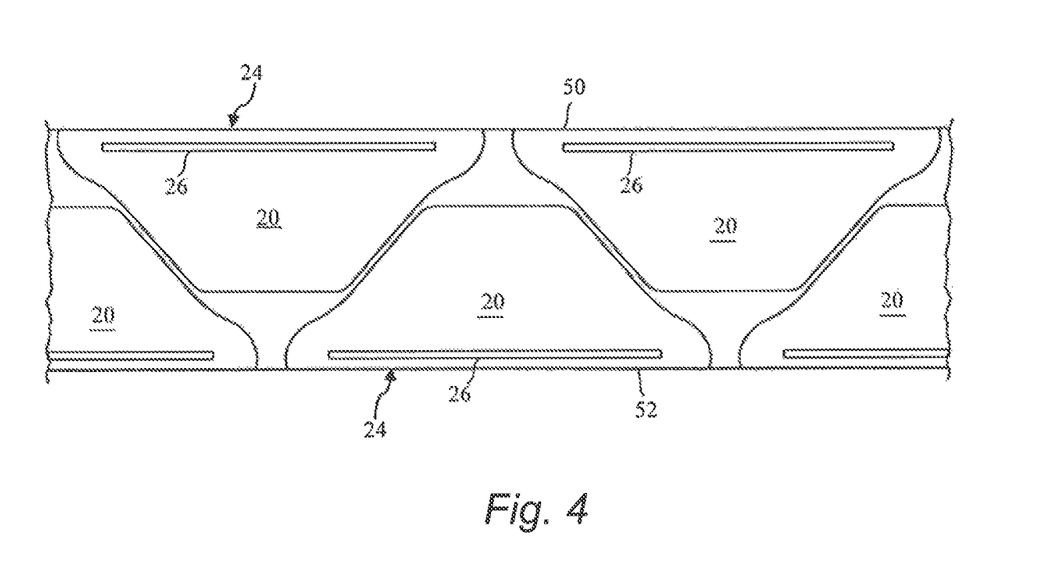
FIG. 4 is a top view of a web having a plurality of facemask panels defined therein, with a nose wire incorporated in edges of alternating panels in the web.

FIG. 4 illustrates the layout of the generally trapezoidal shape for cutting the layers forming the upper body portions 20. A similar layout would be produced for the lower body portion 22, which is then brought into alignment with and bonded to the upper body portion 20 in the facemask manufacturing line. More precisely, the layouts of FIG. 4 represent the outline of cutters which ultimately cut layers 30 and 32 for the upper portion 20 from respective flat sheets of material, with the layouts arranged in an alternating pattern on the flat sheets of material between edges 50, 52 representing the open side of mask 11 formed by top edge 24 and bottom edge 38. The arrangement of the layouts is such that a continuous piece of scrap may be formed as the material is fed through the cutter (not shown) utilized in making mask 11. FIG. 4 illustrates placement of cut nose wires 26 on the portions of the continuous web corresponding to the top edge 24 prior to folding and bonding of the edge binders 36, 40 along the edges 24, 38.

Figure 5:
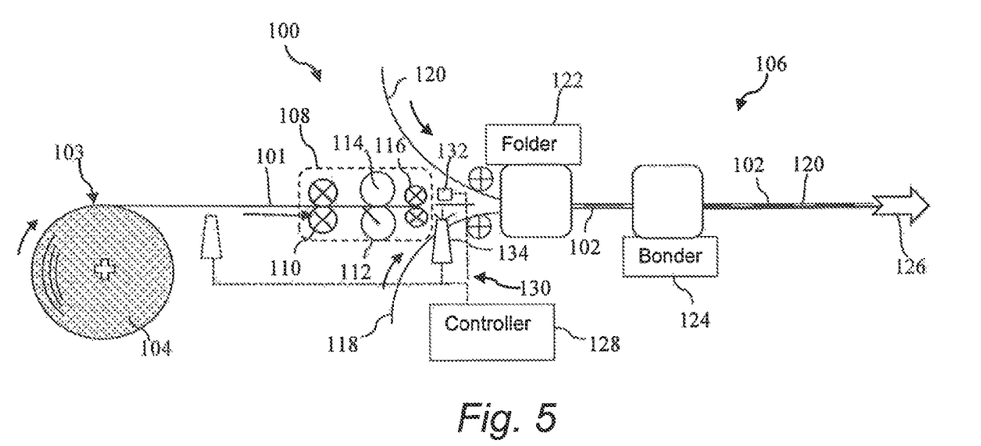
FIG. 5 is a schematic depiction of parts of a facemask production line in accordance with aspects of the invention related to cutting and placement of nose wires on a carrier web for subsequent incorporation with facemask panels.

FIG. 5 depicts portions of a production line 106 for facemasks that incorporate a nose wire 26 (FIG. 4). A running wire 101 is supplied in continuous strip form from a source 103, such as a driven operational running roll 104, to a cutting station 108. Suitable cutting stations 108 are known and used in conventional production lines. The station 108 may include a set of feed rollers 110 that define a driven nip, wherein one of the feed rollers is driven and the other may be an idler roll. The feed rollers 110 may also serve to impart a crimped pattern to the running nose wire, such as diamond pattern. The running wire 101 is fed to a cutter roller 112 configured opposite to an anvil 114, wherein the cuter roller 112 is driven at a rate so as to cut the running wire 101 into individual nose wires 102. Downstream of the cutter roller 112, a pair of delivery rollers 116 transport the individual nose wires 102 from the cutting station 108 onto a carrier web 118. Referring to FIG. 4, this carrier web 118 may be the continuous multi-layer web that defines the upper and lower body portions 20, 22, wherein the individual nose wires 26 are deposited along the edge of the carrier web 118 corresponding to the top edge 24. It should be appreciated that an additional cutting station may be operationally disposed opposite to (and upstream or downstream) of the cutting station 108 for cutting and placing the nose wires on the opposite nested upper body portions 20 in the web depicted in FIG. 4. For the sake of ease of understanding only one such cutting station is illustrated and described herein.

After placement of the individual nose wires 102 in position on the carrier web 118, the binder web 120 is introduced to the production line along both edges of the carrier web 118 (only one binder web 120 is depicted in FIG. 5.). The combination of carrier web 118, nose wire 26, and binder webs 120 pass through a folding station 122 wherein the binder webs 118 are folded around the respective running edges 50, 52 of the carrier web 118 (FIG. 4). The components then pass through a bonding station 124 wherein the binder webs 120 are bonded to the carrier web 118, thereby producing the edge configurations 24, 38 depicted in FIG. 3 with respective binders 36, 40. The nose wire 26 is held in position relative to the top edge 24 by the binder 36.

From the bonding station 124, the continuous combination of carrier web 118 with nose wires 102 under the binder 36 is conveyed to further downstream processing stations 126 wherein the individual facemasks are cut, bonded, head straps are applied, and so forth.

With further reference to FIGS. 5 through 8, aspects of a method 100 and related systems are depicted for cutting and placing the individual nose wires 102 onto the carrier web 118 in the facemask production line 106. As described, at the cutting station 108, the continuous wire 101 is cut into individual nose wires 102 having a defined length. The individual nose wires 102 are conveyed to a treatment station 130 prior to being conveyed onto the carrier web 118. At the treatment station 130, a surface treatment is performed on a side of the nose wires 102 that will lie against the carrier web. The type of surface treatment may vary, wherein the overall purpose of such treatment is increase adherence of the nose wires 102 onto the carrier web so that the nose wires 102 do not slide or fall off of the carrier web during the increased production speeds of the production line 106 needed to achieve the facemask throughputs discussed above. It is not necessary that the treatment performed at the treatment station 130 permanently attach the nose wires 102 to the carrier web 118, although permanent attachment is within the scope of the invention. It may suffice that the surface treatment results in temporary increased surface friction between the nose wires 102 and carrier web 118, or an actual physical engagement of the surface of the nose wires 102 with the fibers of the carrier web 118 resulting from abrasion or "roughening" of the nose wire surface.

FIG. 5 depicts the treatment station 130 in solid lines downstream from the cutting station 108. FIG. 5 also depicts an alternate embodiment in dashed lines wherein the treatment station 130 is operationally disposed upstream of the cutting station 108. With this embodiment, the surface treatment is performed on the running wire 101 before it is cut into individual nose wires 102.

As described, from the treatment station, the carrier web 118 and attached nose wires 102 are conveyed to the folder 122 and bonder 124, wherein the nose wires 102 are encapsulated in the binder web 120 that is folded over an edge of the carrier material 118 and bonded to the carrier material.

FIG. 5 depicts an embodiment wherein the surface treatment carried out at the treatment station 130 applies an adhesive onto the surface of the nose wires 102 as they exit the cutting station 108. An adhesive sprayer 134 may be operationally located at the downstream side of the cutting station 108 and supplied with an adhesive from a supply source. A sensor 132 in communication with a controller 128 senses a leading edge of a nose wire 102 as it is conveyed out of the cutting station 108 by the delivery rollers 116. The controller 128, in turn, activates the sprayer 134 to apply the adhesive onto the surface of the nose wire 102. It is envisioned that various commercially available adhesives can be used for this purpose so long as the adhesive has sufficient initial tack for the nose wires to quickly adhere to the carrier web. The method is thus not limited to any particular adhesive. In a particular, embodiment, the adhesive may be a pressure-sensitive adhesive, wherein the method further includes pressing the nose wires onto the carrier web after application of the adhesive, for example by passing the carrier web and nose wire below a pressing bar or through the nip of a pair of rollers.

Figure 8:
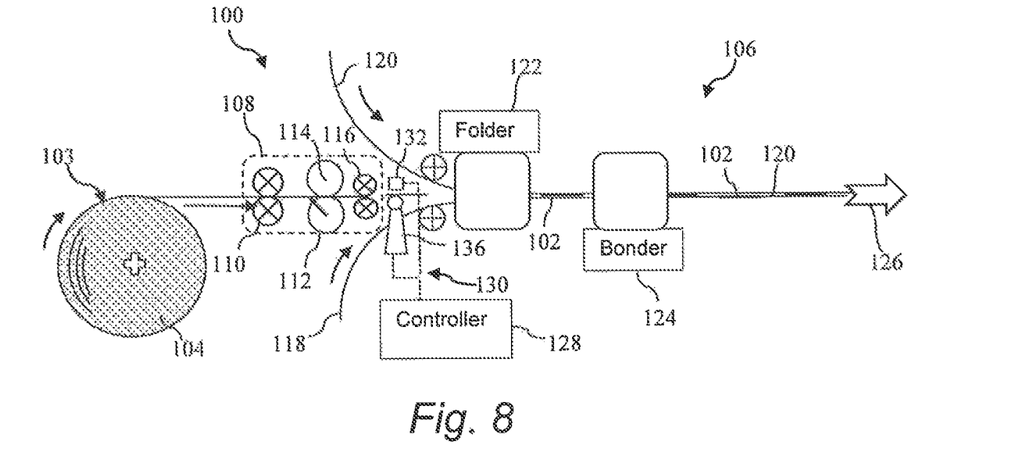
FIG. 8 is a schematic representation of a different embodiment for cutting and placement of nose wires on a carrier web in accordance with aspects of the invention.

FIG. 8 depicts an embodiment for application of an adhesive onto the underside of the nose wires 102 that is similar to the process in FIG. 5. In FIG. 8, a contact applicator 136, such as a roller, brush, blade, and the like, is used to apply the adhesive directly onto the nose wires 102.

With a different method embodiment 100, the surface treatment process may include altering a physical surface characteristic of the side of the nose wire 102 that is placed against the carrier web. For example, this surface may be altered to produce a "roughened" surface that results in increased frictional resistance to sliding or moving of the nose wires 102 on the nonwoven carrier web 118.

Figure 7:
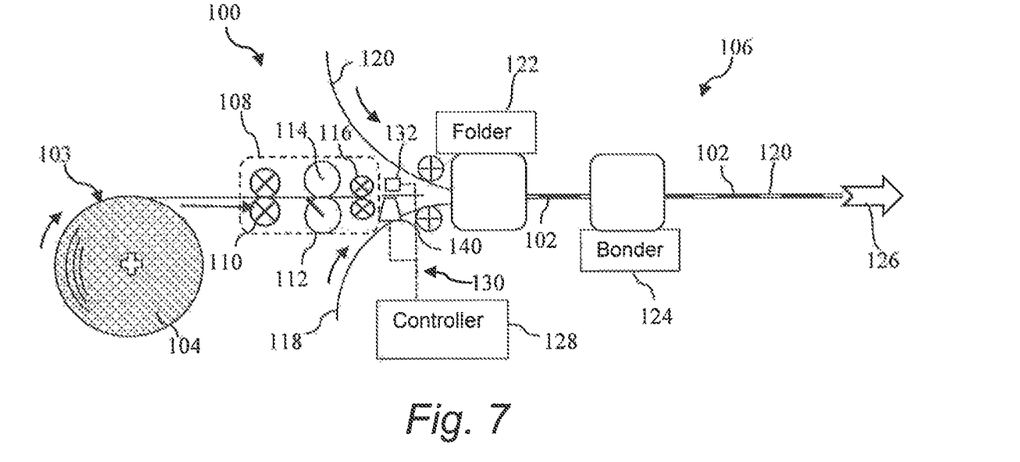
FIG. 7 is a schematic representation of still another embodiment for cutting and placement of nose wires on a carrier web in accordance with aspects of the invention.

Referring to FIG. 7, the abrasion surface treatment process may be carried out mechanically by contacting the surface of the nose wires 102 with an abrasion device 140 prior to placement of the wires 102 onto the carrier web 118, such as a stationary or moving abrasion stone, wire wheel, and so forth. The abrasion device 140 may be stationary, wherein the nose wires 102 are conveyed over the device, or may be rotationally or linearly driven relative to the nose wires 102.

The embodiment of FIG. 7 wherein the abrasion device 149 is used for the surface treatment may be particularly beneficial in that the abrasion device 149 may also function to remove any burrs from the longitudinal ends of the cut nose wires 102 that may result from the relatively high speed cutting process at the cutting station 108. If not removed, such burrs may cause discomfort or irritation to the user of the facemask.

In an alternate abrasion process, an abrasive chemical may be applied to the surface of the nose wires 102 in a coating or spraying process, as depicted in the embodiments of FIGS. 5 and 8.

Figure 6:
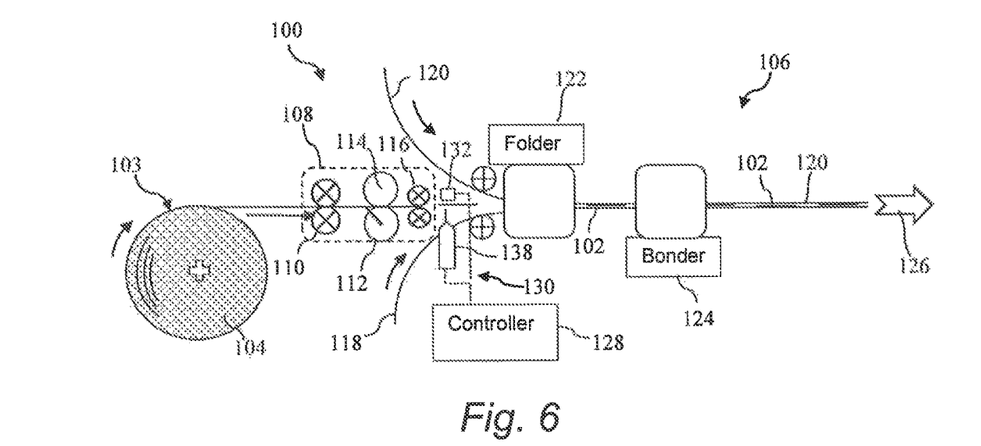
FIG. 6 is a schematic representation of an alternative embodiment for cutting and placement of nose wires on a carrier web in accordance with aspects of the invention.

In the embodiment depicted in FIG. 6, the surface treatment process is carried out by laser etching the surface of the nose wires 102 with a laser 138 at the treatment station 130.

In still a further embodiment, the surface of the nose wires 102 may be roughened by defining a pattern into the surface of the nose wire that increases surface roughness and, thus, resistance to sliding or moving of the nose wire on the carrier web. This pattern may be pressed or etched into the nose wire surface with a laser (FIG. 6), or defined by a crimp roller. In the depicted embodiments, the cutter roller 112 and opposing anvil 114 (which may be a roller) may also serve to press a pattern into the surface of the nose wire 102.

As mentioned, the present invention also encompasses various system embodiments for cutting and placing individual nose wires in a facemask production line in accordance with the present methods. Aspects of such systems are illustrated in the figures, and described and supported above.

The material particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed is:

1. A method for cutting and placing individual nose wires in a facemask production line, comprising:
   supplying a continuous wire from a supply source to a cutting station in the facemask production line;
   at the cutting station, cutting the continuous wire into individual nose wires having a defined length;
   with a treatment station upstream of the cutting station treating the continuous wire with a surface treatment, or with the treatment station downstream of the cutting station, treating the nose wires with the surface treatment;
   from the cutting station, conveying the individual nose wires onto a carrier web with a pair of delivery rollers that deposit the nose wires along an edge of the carrier web corresponding to a top edge of a facemask without reorienting the nose wires that leave the cutting station; and
   wherein at the treatment station, the surface treatment is performed to an underside of the continuous wire or the nose wires such that the nose wires conveyed by the delivery rollers have the surface treatment applied to the underside thereof that lies against the carrier web resulting in an increased surface attachment of the nose wires to the carrier web.

2. The method as in claim 1, wherein the treatment station is downstream of the cutting station and the surface treatment is performed on the individual nose wires.

3. The method as in claim 2, wherein the carrier web and attached nose wires are conveyed from the treatment station to a folder and bonder wherein the nose wires are encapsulated in a binder web that is folded over an edge of the carrier material and bonded to the carrier material.

4. The method as in claim 1, wherein the surface treatment comprises applying an adhesive onto the underside of the nose wires or the continuous wire, the adhesive having sufficient tack for the nose wires to adhere to the carrier web.

5. The method as in claim 4, wherein the adhesive is a pressure-sensitive adhesive, and further comprising pressing the nose wires onto the carrier web after application of the adhesive.

6. The method as in claim 4, wherein the adhesive is sprayed onto the underside of the nose wires or the continuous wire.

7. The method as in claim 4, wherein the adhesive is coated onto the underside of the nose wires or the continuous wire.

8. The method as in claim 1, wherein the surface treatment comprises altering a surface characteristic of the underside of the nose wires or the continuous wire.

9. The method as in claim 8, comprising abrading the underside of the nose wires or the continuous wire.

10. The method as in claim 9, wherein the abrading is done mechanically by contacting the underside of the nose wires or the continuous wire with an abrasion device.

11. The method as in claim 9, wherein the abrading is done chemically by applying an abrasive chemical to the underside of the nose wires or the continuous wire.

12. The method as in claim 8, comprising defining a pattern into the underside of the nose wires or the continuous wire that increases surface roughness.

13. The method as in claim 12, wherein the pattern is etched with a laser.

14. The method as in claim 12, wherein the pattern is defined by a crimp roller.

\* \* \* \* \*